United States Patent [19]

Roché

[11] Patent Number: 4,521,883

[45] Date of Patent: Jun. 4, 1985

[54] TELEPHONY APPARATUS HAVING FILTER CAPACITOR SWITCHED TO UNDERGO DISCRETE PHASE JUMPS

[76] Inventor: Bernard Roché, 13, rue de Bourgogne, Lannion, France, 92140

[21] Appl. No.: 390,789

[22] Filed: Jun. 21, 1982

[30] Foreign Application Priority Data

Jun. 22, 1981 [FR] France ............................... 81 12251

[51] Int. Cl.³ ................................................ H04J 3/06
[52] U.S. Cl. ...................................... 370/100; 375/110
[58] Field of Search ....................... 370/100; 375/110; 333/173

[56] References Cited

U.S. PATENT DOCUMENTS 3,649,757 3/1972 McNeilly et al. ................... 370/100
3,732,376 5/1973 Chatelon ............................. 370/100
4,124,778 11/1978 Amass ................................ 370/100

OTHER PUBLICATIONS

S. Maskara, "Novel Synchronization Scheme for Rate Half Convolutional", IE(I) Journal-ET, vol. 61, Apr. 1981, pp. 80–82.

Primary Examiner—Douglas W. Olms
Assistant Examiner—Wellington Chin
Attorney, Agent, or Firm—Lowe, King, Price & Becker

[57] ABSTRACT

A telephony audio signal is transmitted as a digital signal by a transmitter that derives: (1) a master clock of frequency $F_{MC}$, (2) a time slot signal of frequency $F_{TS}=F_{MC}\div 2^N$, and (3) a transmit control signal of frequency $F_{WT}=F_{MC}\div 2^N$. The frequencies $F_{TS}$ and $F_{WT}$ control the digital signal transmission frequency. A receiver responsive to the digital signal derives the master clock frequency and includes a switched capacitor filter. The receiver derives a reception synchronization signal having a frequency $F_{RS}$ that is much lower than and asynchronous with the master clock frequency but which has approximately the same frequency as the time slot signal. In response to the information signal and the master clock frequency at the receiver and to the reception synchronization signal, a pulse amplitude modulated signal indicative of the information signal to which the receiver is responsive is supplied to the switched capacitor filter. In response to the master clock frequency at the receiver and the reception synchronization signal a switching control signal for the filter is derived. The filter is switched a predetermined number of times during each period of the reception synchronization signal. The switching times undergo discrete phase jumps that occur at times such that the filter is switched in a plesiosynchronous manner with the reception synchronization signal.

8 Claims, 5 Drawing Figures

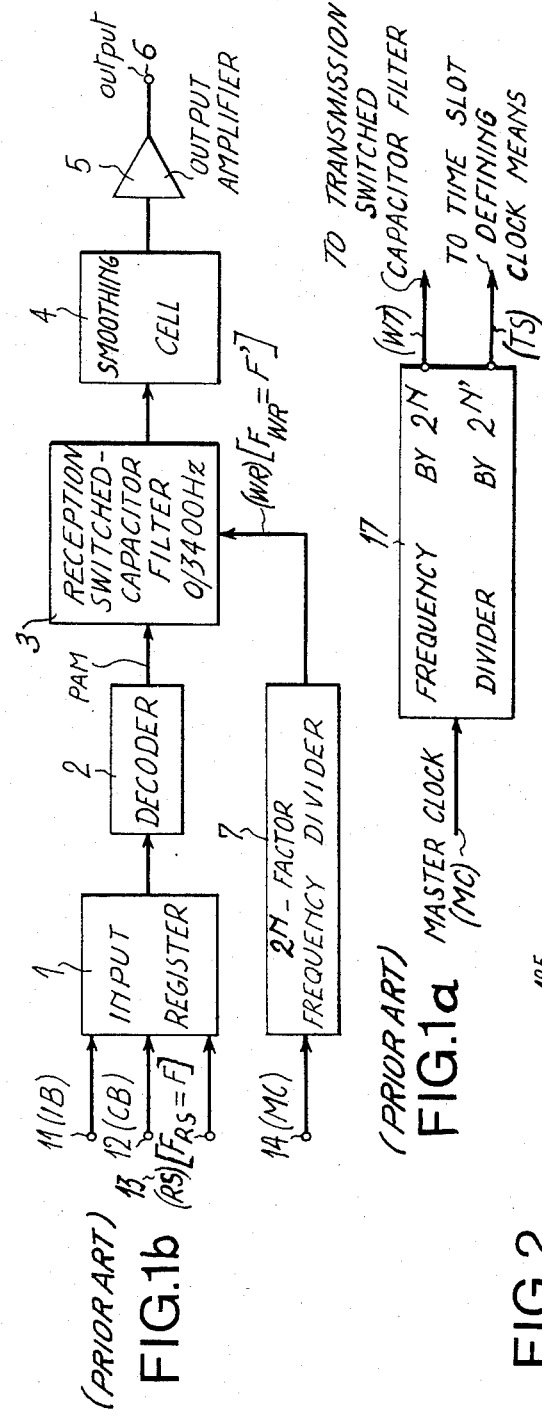
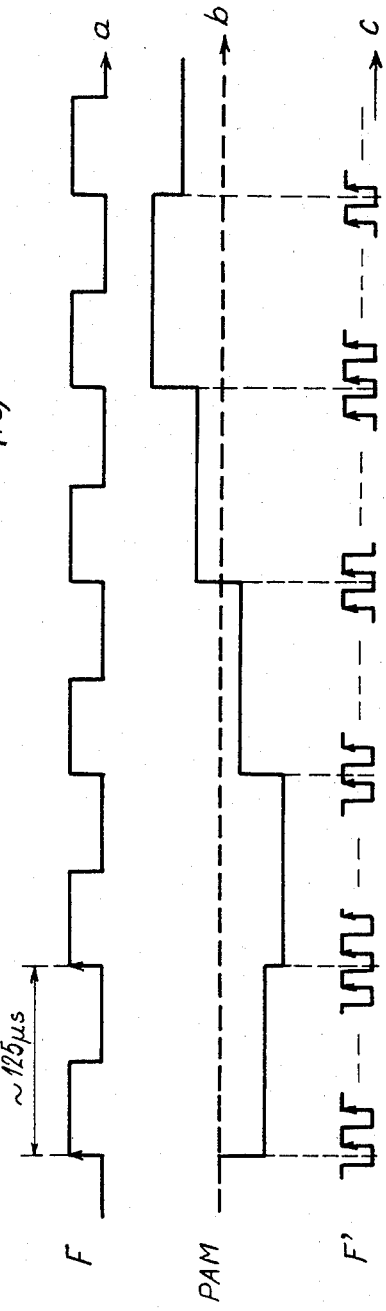
FIG. 1a (PRIOR ART)
FIG. 1b (PRIOR ART)
FIG. 2

TELEPHONY APPARATUS HAVING FILTER CAPACITOR SWITCHED TO UNDERGO DISCRETE PHASE JUMPS

BACKGROUND OF THE INVENTION

1. Field of the Invention

The present invention relates to pulse code modulation (PCM) and is telephone communication systems and receivers, wherein the receiver comprises a switched capacitor filter and more particularly to a receiver including a switched capacitor filter that is switched a predetermined number of times during each synchronization period by a control signal having discrete phase phase shifts.

It is a known fact that a resistor plus capacitor (RC) network is equivalent to one in which each resistor is replaced by a combination of a capacitor and two switch circuits. If $C_R$ is the capacity of the combination capacitor and T the switching period of the switch circuits, then the resistance R equivalent combination is given by $$R = T/C_R.$$

(See "Sampled Analog Filtering Switched Capacitors as Resistor Equivalents" by Jerry Caves and al., I.E.E.E. Journal of Solid State Circuits, Vol. SC 12, No. 6, December, 1977). For the operation of filters using switched capacitors for processing an audio-frequency signal, a clock of some 128 to 512 kHz is required.

In PCM systems, two types of synchronization are required, viz: frame synchronization and bit synchronization. Therefore digital transmission and reception terminals of a monolithic "codec+filter" circuit are each comprised of a group of three terminals transmitting or receiving the following signals:

(a) the information bits in the form of a digital sequence from 64 to 2048 kbit/s;
(b) clock bits synchronous with the information bits used for reading out the latter;
(c) a frame synchronization signal permitting identification of the time slot in the frame or multiframe.

U.S. Pat. No. 3,649,757 issued Mar. 14, 1972 discloses a decoder for receiving PCM signals and frame synchronization signals and connected to an output analog filter.

Over and above these two groups of three terminals, the circuit, in order to function, requires a 2048 kbit/s master clock (case of A coding law).

The control signals for the transmission and reception switched capacitor filters generally result from dividing the master clock. This master clock, unless split into two, can only be synchronous, in the case of the asynchronous codecs, with one of the transmission and reception synchronization signals; it is plesiosynchronous with the other. It will be assumed that the master clock is synchronous with the transmission synchronization signal.

The master clock pulses and consequently the switched capacitor reception filter control signal which is deduced therefrom by division is plesiosynchronous, i.e., close to being synchronous, with the reception synchronization signal.

The lack of synchronism between the reception synchronization signal and the switched-capacitor reception filter control signal gives rise to parasitic spectral lines in the output signal from this filter; the intensity of the spectral lines is somewhat excessive thus making the integrated circuit unusable.

2. Description of Prior Art

These parasitic spectral lines may be avoided by:
- utilizing two master clocks respectively synchronous with the time slot defining signals in the transmission and reception directions thus requiring two additional pins and the inclusion of a circuit for the two clocks outside the integrated circuit;
- providing a master reception clock synchronous with the received synchronization signal using a phase lock loop, which needs a significant area of the silicon chip ($\simeq 15\%$ of the silicon circuit area);
- introducing a pulse amplitude-modulated signal smoothing cell between the decoder and the reception filter, which also needs additional area on the silicon chip.

The prime object of this invention is to provide a monolithic "codec+filter" integrated circuit in which the parasitic spectral lines are eliminated by employing a perfected frequency divider circuit using an integrated circuit having an additional area much less than than used by a phase lock loop or prefiltering cell.

It will now be shown in relation to FIGS. 1a and 1b how the lack of synchronization between the reception synchronization signal and the switched-capacitor reception filter control signal causes parasitic spectral lines.

In reference to FIG. 1b, a block diagram of a decoder and switched capacitor filter of the prior art, there are provided an input shift register 1, a decoder 2, a switched-capacitor low pass filter 3 with a pass band from 0 to 3,400 Hz, a smoothing cell 4, an output amplifier 5 and the audio-frequency signal output terminal 6. Input register 1 has three inputs 11, 12, 13 that respectively receive the information bits (IB), the clock bits (CB) and the reception synchronization signal (RS). The circuit of FIG. 1b responds to master clock (MC) and reception synchronization signal (RS) to derive control signal (WR), having a frequency $F_{WR}$. The transmitter of FIG. 1a responds to master clock (MC) to derive control signal (WT) and time slot defining signal (TS).

The frequencies of signals IB, CB, TS, RS, MC and WR are respectively given by $F_{IB}$, $F_{CB}$, $F_{TS}$, $F_{RS}=F$, $F_{MC}$, $F_{WR}=F'$. By way of an example, it may be assumed that:

$F_{IB}=F_{CB}$ between 64 and 2048 kHz $F_{MC}=2048$ kHz $F_{WR}=F'=256$ kHz $F_{TS}=8$ kHz $F_{RS}=8$ kHz In the case of a coder and transmission filter (FIG. 1a), the signals defining the time slots TS and controlling the transmission filter WT are both derived from the master clock by divider 17 dividing the master clock pulse frequency $F_{MC}$ by $2^N=8$, (N=3) and $2^{N'}=256$, (N'=8) so that the frequencies $F_{TS}$ and $F_{WT}$ of signals TS and WT are $F_{MC} \div 2^N$ and $F_{MC} \div 2^{N'}$ respectively.

In the case of a decoder and reception filter (FIG. 1b), it is not possible to obtain (RS) and (WR) by division of (MC) since (TS) and (RS) are asynchronous and (TS) has already been made synchronous with (WT).

Let the following expressions be written, where:

$y_e = \sum_n \cos[2\pi\nu n/F]\delta(n/F)$   represents the audio-signal and $\nu$ its frequency.

represents the sampled signal with recurrence frequency $F$ $y_b = y_e * \pi(t)$   represents the NRZ sampled signal where $\pi(t)$ is a function defined by:

$$\pi(t) = \begin{cases} 0 \text{ if } t\notin[0, (1/F)[ \\ 1 \text{ if } t\in[0, (1/F)[ \end{cases}$$

$F$ being the sampling frequency.

The spectrum of the sampled signal is:

$$F(y_b) = F(y_e) * F(\pi)$$

$$= e^{j\pi f/F} \times \frac{1}{\pi f} \sin(\pi f/F) \times \frac{1}{2} \sum_n [\delta(nF - \nu) + \delta(nF + \nu)]$$

$$= \frac{1}{2} \sum_n e^{j\pi(n\pm\nu/F)} \frac{\sin\pi(n \pm \nu/F)}{F \times \pi(n \pm \nu/F)} \delta F(n \pm \nu/F)$$

The signal resampled at a frequency $F'$ is:

$$z = y_b \times \sum_k \delta(k/F')$$

having a Fourier transform given by:

$$F(z) = F(y_b) * \sum_k (kF')$$

i.e.

$$F(z) = \frac{1}{2\pi} \sum_k \sum_n e^{j\pi(n\pm\nu/F)} \times \frac{\sin\pi(n \pm \nu/F)}{F(n \pm \nu/F)} \times \delta[nF \pm \nu - kF']$$

First example:
The frequency $(nF-kF')$ falls within the band 0–4 kHz for $F=8$ kHz; $F'=256$ kHz; $k=1$; $n=32$.
If it is assumed that:

$$F = (1-5\times10^{-5})\times 8 \text{ kHz}$$

$$F' = (1+5\times10^{-5})\times 256 \text{ kHz}$$

then we have:

$$\epsilon = nF - kF' = 32(1+5\times 15^{-5})8 - (1-5\times 10^{-5})256 \text{ kHz}$$

$\epsilon = 25.6$ Hz and its multiples upto the 156th degree.

Second example:
The frequency $(nF-kF')$ falls within the band 0–4 kHz for $F=8$ kHz; $F'=2048$ kHz; $n=256$; $k=1$
If it is assumed that:

$$F = (1+5\times 10^{-5})\times 8 \text{ kHz}$$

$$F' = (1-5\times 10^{-5})\times 2048 \text{ kHz}$$

then we have:

$$\epsilon = nF - kF' = 256(1+5\times 10^{-5})8 - (1-5\times 10^{-5})20 - 48$$

$\epsilon = 204.8$ kHz and its multiples upto the 19th degree. In view of the attenuation introduced by the $$\frac{\sin x}{x} \text{ term } \frac{\sin \pi(n \pm \nu/F)}{\pi(n \pm \nu/F)}$$

and the order of magnitude of $\epsilon$, the calculation may be restricted in the majority of cases for determining the line amplitude in the 0–4 kHz band to:

$$\sum_k \frac{\sin(\pi\nu/F)}{2\pi F(nk + \nu/F)} \times \delta(\nu - k\epsilon) \quad (1)$$

Tables 1 and 2 set forth:
the relative level of the main lines for a sinusoidal signal with frequencies of respectively 700, 1000 and 1100 Hz;
the signal to noise ratio for various audio signal frequencies in the event of a reception filter control signal frequency $F'$ equal to $(1+5\times 10^{-5})\times F'$ where $F'=128$, 258 or 2048 kHz.

SUMMARY OF THE INVENTION

In the invention, a divider of the master clock frequency $F_{MC}$ controls the switched-capacitor reception filter such that this divider produces a constant number of samples per reception synchronization period, i.e. per analog signal sample.

The advantage of this solution lies in achieving good quality characteristics with a divider circuit which needs only a very small area of the integrated circuit semiconductor chip compared to the area of a phase lock loop or a prefiltering cell.

BRIEF DESCRIPTION OF THE DRAWINGS

The invention will now be described in detail with reference being made to the accompanying drawings in which:

FIG. 1a and 1b depict the transmitter and receiver part in a codec+filters as per former art and that was described in relation to the foregoing:

FIG. 2 is a signal diagram useful in describing the sampling of the analog signal and the resampling due to the switched-capacitor filter;

DESCRIPTION OF PREFERRED EMBODIMENTS

Referring now to FIG. 2, there is illustrated a square wave "a" representing a reception synchronization signal at frequency F, a multi-level signal "b" having transitions synchronized with the positive going variations of square wave "a" to represent PAM samples in NRZ form, and a filter control signal "c" having a frequency $F_{MC}/2^N=F'$. Signals "a" and "c" with frequencies F and F' are not synchronized, thus giving rise to the parasitic spectral lines.

The amplitudes of these parasitic lines are given in Table No. 1, infra, in the cases of 700, 1000 and 1100 Hz sinusoidal signals and of the first example above where the lines differ by $\epsilon = 25.6$ Hz.

In Table No. 2 are given the signal to noise ratio for various audio-signal frequencies as was stated previously. From Table 2, it is noted that the condition generally imposed on monolithic "codec+filter" integrated circuits, namely that the parasitic lines and the signal between 700 and 1100 Hz differ by 46 dB, is not satisfied for certain values of $\nu$ and F'.

Figure 3:
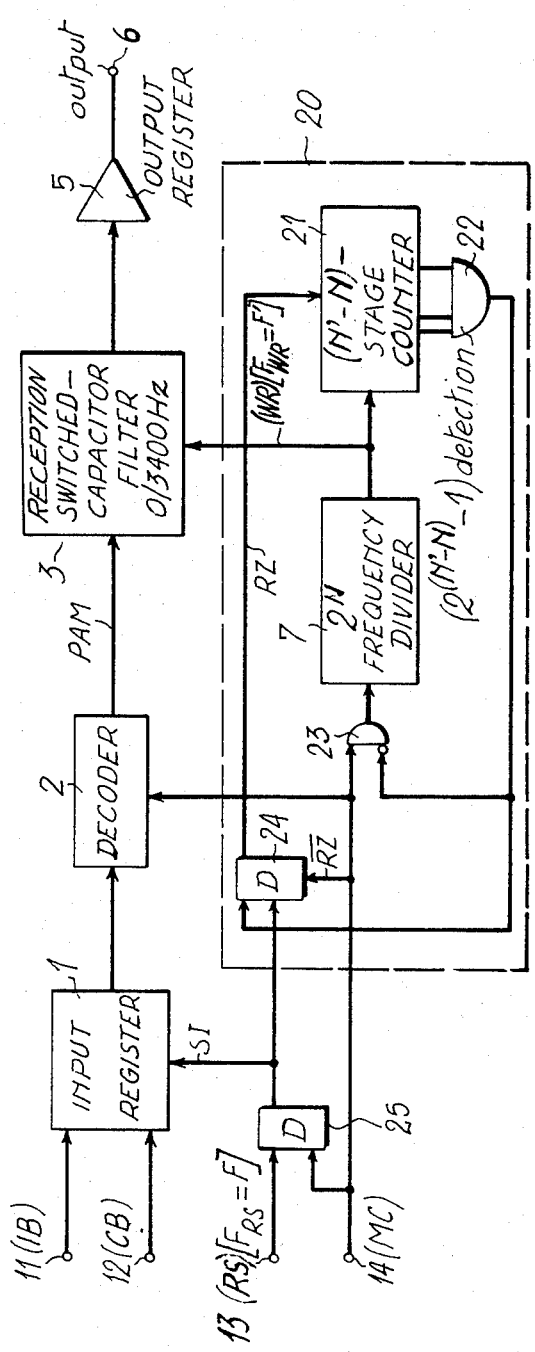
FIG. 3 depicts the switched-capacitor filter control circuit.

In FIG. 3 which depicts the codec and filters as per the invention, frequency divider 7 (FIG. 1b) which generates the frequency F' filter control signal using the frequency $F_{MC}$ master clock is replaced by a frequency division unit 20 controlled such that unit 20 generates a constant number of filter control pulses per amplitude modulated sample leaving the decoder, i.e. per time slot period 1/F. Putting this another way, there is a constant number of pulses F' per period 1/F and the frequency F' signal undergoes phase jumps.

The amplitude of $2^N$ frequency divider 7 of division unit 20 is connected to drive a counter 21 with (N'−N) stages; counter 21 overflows upon reaching $2^{(N'-N)} - 1$, as detected by AND gate 22. The overflow indicating output signal of gate 22 is fed, on the one hand, with inversion, to AND gate 23 which regulates the master clock pulse supply to divider 7 and, on the other hand, to a D-type flip-flop 24.

The circuit comprising frequency divider 7, counter 21, AND gate 22 and AND gate 23 behaves like a consecutive pulse train generator with a frequency F'. If N=3 and if the master clock supplies clock pulses at a frequency 2048 kHz, then F'=(2048 kHz/23)=256 kHz. Counter 21 then counts to 31, whereby the generator comprising divider 7 produces 32-pulse pulse trains at a recurrence frequency of 256 kHz. The generator comprising divider 7 stops when counter 21 and gate 22 detect that the generator has derived 31 pulses and recommences at the instigation of D-type flip-flop 24 which feeds a reset (RZ) pulse to the counter 21, thus unblocking AND gate 23.

Figure 4:
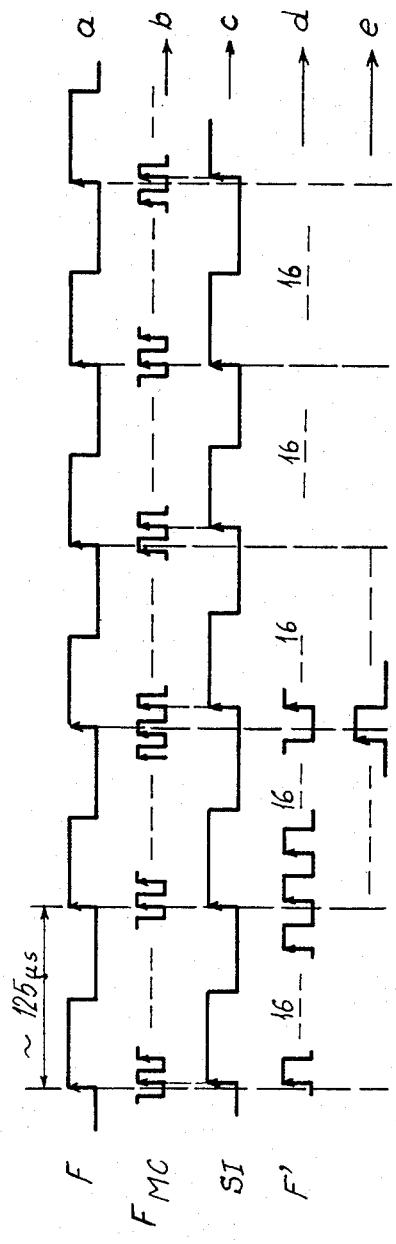
FIG. 4 is a signal diagram useful in describing how the circuit in FIG. 3 functions.

D-type flip-flop 25 repositions the leading edges of the frequency F' signal on the frequency $F_{MC}$ master clock signal leading edges as shown by waveforms "a", "b" and "c" in FIG. 4. The output signal SI from D-type flip-flop 25 is fed into input register 1 and the clock input of D-type flip-flop 24; an input of flip-flop 24 receives the overflow signal from counter 21 (line 3 in FIG. 4). D flip-flop 24 supplies counter 21 with a start, i.e. reset signal RZ which coincides with the leading edge of signal SI. Flip-flop 24 is set to the reset position by the master clock signal MC.

It is clear that, since the frequencies $F_{MC}$ and F of master clock signal MC and reception synchronization signal RS are not synchronized, there are not always 256 master clock pulses in one synchronization period 1/F=125 μs. Each train of 32 pulses should therefore commence either at the end of the 32nd pulse or 488 ns later. The reception synchronization signal of waveform "a", having a period of 125 microseconds, has a frequency of 8 kHz; i.e., there is a time slot frequency, F, of 8 kHz.

In FIG. 3:
Division factor of divider 7:

$$\frac{\text{master clock (MC) frequency}}{\text{filter 3 feed frequency}} = F_{MC}/F' =$$

$$\frac{2,048,000}{256,000} = 2^3 \text{ hence } N = 3$$

Division factor of counter 21:

$$\frac{\text{filter feed frequency}}{\text{time slot frequency}} = F'/F =$$

$$\frac{256,000}{8,000} = 2^5 \text{ hence } N' - N = 5 \text{ and } N' = 8$$

Let us assume that F'=128,000 Hz, with F and $F_{MC}$ keeping the same values as before. Then:

$$F_{MC}/F' = \frac{2,048,000}{128,000} = 2^4 \text{ hence } N = 4$$

$$F'/F = \frac{128,000}{8,000} = 2^4 \text{ hence } N' - N = 4 \text{ and } N' = 8$$

There are 16 pulses at recurrence frequency F' in each period of signal SI as indicated in line d of FIG. 4.

Table No. 3 gives the amplitude of the strongest parasitic lines together with the signal to noise ratio for various audio-frequency signal frequency values. It can be seen that the difference between the parasitic lines and the signal is greater between 700 and 1100 Hz than 46 dB.

TABLE No. 1

| RECEPTION SYNCHRO $8(1 + 5 \times 10^{-5})$ kHz FILTER CLOCK $256(1 - 5 \times 10^{-5})$ kHz | | | | | |
|---|---|---|---|---|---|
| audio signal 700 Hz | | audio signal 1000 Hz | | audio signal 1100 Hz | |
| Parasitic Rays Hz | Level | Parasitic Rays Hz | Level | Parasitic Rays Hz | Level |
| 444.0 | −71.3 | 744.0 | −68.3 | 844.0 | −67.4 |
| 469.6 | −70.4 | 769.6 | −67.3 | 869.6 | −66.5 |
| 495.2 | −69.4 | 795.2 | −66.3 | 895.2 | −65.5 |
| 520.8 | −68.2 | 820.8 | −65.1 | 920.8 | −64.3 |
| 546.4 | −66.9 | 846.4 | −63.8 | 946.4 | −63.0 |
| 572.0 | −65.3 | 872.0 | −62.2 | 972.0 | −61.4 |
| 597.6 | −63.3 | 897.6 | −60.3 | 997.6 | −59.4 |
| 623.2 | −60.8 | 923.2 | −57.7 | 1023.2 | −56.0 |
| 648.8 | −57.3 | 948.8 | −54.2 | 1048.8 | −53.4 |
| 674.4 | −51.3 | 974.4 | −48.2 | 1074.4 | −47.4 |
| 700.0 | .0 | 1000.0 | .0 | 1100.0 | .0 |
| 725.6 | −51.2 | 1025.6 | −48.1 | 1125.6 | −47.3 |
| 751.2 | −57.2 | 1051.2 | −54.1 | 1151.2 | −53.3 |
| 776.8 | −60.8 | 1076.8 | −57.7 | 1176.8 | −56.8 |
| 802.4 | −63.3 | 1102.4 | −60.1 | 1202.4 | −59.3 |
| 828.0 | −65.2 | 1128.0 | −62.1 | 1228.0 | −61.2 |
| 853.6 | −66.8 | 1153.6 | −63.6 | 1253.6 | −62.8 |
| 879.2 | −68.1 | 1179.2 | −65.0 | 1279.2 | −64.1 |
| 904.8 | −69.2 | 1204.8 | −66.1 | 1304.8 | −65.3 |
| 930.4 | −70.3 | 1230.4 | −67.1 | 1330.4 | −66.3 |
| 956.0 | −71.2 | 1256.0 | −68.0 | 1356.0 | −67.2 |

TABLE No. 2

| RECEPTION CLOCK $8(1 + 5 \times 10^{-5})$ kHz MASTER CLOCK $2048(1 - 5 \times 10^{-5})$ kHz | | | | | | | | | | |
|---|---|---|---|---|---|---|---|---|---|---|
| Audio frequency $\nu$ = | 500 | 700 | 1000 | 1100' | 1500 | 2000 | 2500 | 3000 | 3400 | Hz |
| F' = 128 kHz | 43.2 | 40.3 | 37.2 | 36.4 | 33.7 | 31.2 | 29.3 | 27.7 | 26.6 | |
| F' = 256 kHz | 49.3 | 46.3 | 43.2 | 42.4 | 39.7 | 37.2 | 35.3 | 33.7 | 32.7 | |

TABLE No. 2-continued

| | RECEPTION CLOCK $8(1 + 5 \times 10^{-5})$ kHz | | | | | | | | |
|---|---|---|---|---|---|---|---|---|---|
| | MASTER CLOCK $2048(1 - 5 \times 10^{-5})$ kHz | | | | | | | | |
| Audio frequency $\nu =$ | 500 | 700 | 1000 | 1100' | 1500 | 2000 | 2500 | 3000 | 3400 Hz |
| F' = 2048 kHz | 67.3 | 64.3 | 61.2 | 60.4 | 57.7 | 55.3 | 53.4 | 52.2 | 53.9 |

Signal to noise ratio with respect to the audio-frequency

TABLE No. 3

| $\nu$ in Hz | Higher Parasite Spectral Rays | S/B (dB) |
|---|---|---|
| 700 | −66 | 61 |
| 1000 | −63 | 58 |
| 1100 | −62 | 57 |
| 3000 | −53 | 49 |

What I claim is:

1. A system for transmitting and receiving telephony audio signals comprising:
   a transmitter, the transmitter including:
      means responsive to a telephony audio signal to be transmitted for deriving a digital information signal,
      a master clock source having a frequency $F_{MC}$,
      means responsive to the master clock source for deriving a time slot defining signal having a frequency $F_{TS}=F_{MC}\div 2^{N'}$, where N' is an integer greater than 2, and for deriving a transmit control signal having a frequency $F_{WT}=F_{MC}\div 2^N$, where N is an integer greater than 1 and less than N', the frequencies $F_{TS}$ and $F_{WT}$ controlling the frequency at which the digital information is transmitted from the transmitter;
   a receiver responsive to the digital information signal, the receiver including:
      a switched capacitor filter,
      means for deriving the master clock frequency $F_{MC}$,
      means for deriving a reception synchronization signal having a frequency $F_{RS}$ that is much lower than and asynchronous with the master clock frequency but which has approximately the same frequency as the time slot defining frequency,
      means responsive to the information signal and the master clock frequency at the receiver, as well as to the reception synchronization signal, for supplying a pulse amplitude modulated signal indicative of the information signal to which the receiver is responsive to the switched capacitor filter,
      means responsive to the master clock frequency at the receiver and the reception synchronization signal for deriving a switching control signal for the switched capacitor filter so that the filter is switched a predetermined number of times during each period of the reception synchronization signal while causing the switching time to undergo discrete phase jumps that occur at times uch that the filter is switched in a manner that is plesiosynchronous with the reception synchronization signal, the means for deriving the switching control signal including means for normally dividing the frequency of the master clock signal at the receiver by $2^N$, and means for inhibiting derivation of a cycle by the means for dividing in response to the means for dividing deriving $2^{N'-N}$ cycles.

2. The system of claim 1 further including means for deactivating the means for inhibiting in response to the first transistion of a predetermined polarity that occurs in the master clock frequency at the receiver that occurs after the first transition of a predetermined polarity of the reception synchronization signal that occurs after the frequency divider has derived $2^{N'-N}$ cycles.

3. The system of claim 2 wherein the means for frequency dividing includes a $2^N$ frequency divider having an output coupled to the filter as the switching control signal and to a counter for sensing a count of $2^{N'-N}-1$ from the frequency divider, the frequency divider being responsive to a gate having an input responsive to the master clock frequency at the receiver and an inhibiting input coupled to respond to an output of the counter indicating that a count of $2^{N'-N}-1$ has been sensed thereby, and flip-flop means responsive to the counter output indicating that the count of $2^{N'-N}-1$ has been sensed, to the master clock frequency at the receiver and the reception synchronization signal for resetting the counter.

4. The system of claim 1 wherein the means for frequency dividing includes a $2^N$ frequency divider having an output coupled to the filter as the switching control signal and to a counter for sensing a count of $2^{N'-N}-1$ from the frequency divider, the frequency divider being responsive to a gate having an input responsive to the master clock frequency at the receiver and an inhibiting input coupled to respond to an output of the counter indicating that a count of $2^{N'-N}-1$ has been sensed thereby.

5. Apparatus for detecting a digital information signal indicative of telephony analog signals, the digital signal being coupled to a receiver together with a reception synchronization signal and a master clock signal, the reception synchronization signal having a frequency $F_{RS}$ which is much lower than and is asynchronous with a constant frequency of the master clock signal having a frequency $F_{MC}$, the detecting apparatus comprising:
   a switched capacitor filter,
   means responsive to the information signal and the master clock signal and the reception synchronization signal for supplying a pulse amplitude modulated signal indicative of the information signal to which the receiver is responsive to the switched capacitor filter,
   means responsive to the master clock frequency and the reception synchronization signal for deriving a switching control signal for the switched capacitor filter so that the filter is switched a predetermined number of times during each period of the reception synchronization signal while causing the switching times to undergo discrete phase jumps that occur at times such that the filter is switched in a manner that is pleisosynchronous with the reception synchronization signal, the means for deriving the switching control signal including means for normally dividing the frequency of the master clock signal by a predetermined factor, and means for inhibiting derivation of a cycle by the means for dividing in response to the means for dividing deriving a predetermined number of cycles.

6. The apparatus of claim 5 wherein the means for normally dividing includes means for dividing the frequency of the master control signal by $2^N$, and the means for inhibiting derivation inhibits the derivation of a cycle by the means for dividing in response to the means for dividing deriving $2^N-N$ cycles.

7. The apparatus of claim 6 wherein the means for frequency dividing includes a $2^N$ frequency divider having an output coupled to the filter as the switching control signal and to a counter for sensing a count of $2^N-N-1$ from the frequency divider, the frequency divider being responsive to a gate having an input responsive to the master clock frequency at the receiver and an inhibiting input coupled to respond to an output of the counter indicating that a count of $2^N-N-1$ has been sensed thereby, and flip-flop means responsive to the counter output indicating that the count of $2^N-N-1$ has been sensed, to the master clock frequency at the receiver and the reception synchronization signal for resetting the counter.

8. The apparatus of claim 5 wherein the means for frequency dividing includes a $2^N$ frequency divider having an output coupled to the filter as the switching control signal and to a counter for sensing a count of $2^N-N-1$ from the frequency divider, the frequency divider being responsive to a gate having an input responsive to the master clock frequency at the receiver and an inhibiting input coupled to respond to an output of the counter indicating that a count of $2^N-N-1$ has been sensed thereby.

* * * * *